(12) United States Patent
Nakamura et al.

(10) Patent No.: US 7,341,297 B2
(45) Date of Patent: Mar. 11, 2008

(54) AUTOMOTIVE STORAGE APPARATUS

(75) Inventors: Takahiro Nakamura, Wako (JP); Sumio Yokoyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/458,848

(22) Filed: Jul. 20, 2006

(65) Prior Publication Data
US 2007/0024075 A1 Feb. 1, 2007

(30) Foreign Application Priority Data
Aug. 1, 2005 (JP) ............................. 2005-222752

(51) Int. Cl.
*B60R 7/04* (2006.01)
*B60N 2/46* (2006.01)

(52) U.S. Cl. ............... 296/24.34; 224/926; 297/188.14

(58) Field of Classification Search ............... 296/24.3, 296/24.34, 37.1, 37.8, 37.9, 37.14; 297/188.14, 297/188.19; 224/926; D12/415, 419, 421, D12/423, 424, 425, 426
See application file for complete search history.

(56) References Cited

U.S. PATENT DOCUMENTS

| | | | | |
|---|---|---|---|---|
| 2,099,122 A | * | 11/1937 | Kreisler | 132/303 |
| 2,311,968 A | * | 2/1943 | Schallis | 220/478 |
| 2,325,721 A | * | 8/1943 | Visser | 131/235.1 |
| 2,372,381 A | * | 3/1945 | Kramer | 296/37.9 |
| 4,854,632 A | * | 8/1989 | Kreuze et al. | 296/37.12 |
| 4,927,108 A | * | 5/1990 | Blazic et al. | 248/311.2 |
| 5,085,481 A | * | 2/1992 | Fluharty et al. | 296/37.8 |
| 5,267,893 A | * | 12/1993 | Mangigian | 453/54 |
| 5,379,787 A | * | 1/1995 | Haines | 131/242 |
| 5,878,986 A | * | 3/1999 | Sun et al. | 248/311.2 |
| 6,039,296 A | * | 3/2000 | Nishina et al. | 248/311.2 |
| 6,168,059 B1 | * | 1/2001 | Salenbauch et al. | 224/539 |
| 6,450,468 B1 | * | 9/2002 | Hamamoto | 248/311.2 |
| 6,478,204 B2 | * | 11/2002 | Lange et al. | 224/539 |
| 6,499,785 B2 | * | 12/2002 | Eguchi | 296/37.8 |
| 6,616,206 B2 | * | 9/2003 | Luginbill et al. | 296/37.8 |
| 6,672,554 B2 | * | 1/2004 | Fukuo | 248/311.2 |
| 6,685,152 B2 | * | 2/2004 | Shirase et al. | 248/311.2 |
| 6,702,243 B2 | * | 3/2004 | Takeichi | 248/311.2 |
| 6,702,352 B2 | * | 3/2004 | Nakanishi et al. | 296/24.34 |

(Continued)

FOREIGN PATENT DOCUMENTS

DE    10 2004 011 306    9/2005

(Continued)

*Primary Examiner*—D. Glenn Dayoan
*Assistant Examiner*—Paul Chenevert
(74) *Attorney, Agent, or Firm*—Rankin, Hill & Clark LLP

(57) ABSTRACT

The present invention provides an automotive storage apparatus which can store various types of articles so as to improve the convenience for use. An automotive storage apparatus has a storage apparatus main body in which an opening which opens upward can be covered and uncovered by a slidable lid unit and a box unit which can detachably be installed in the storage apparatus main body and which covers part of the opening when installed, and in such a state that the box unit is installed in the storage apparatus main body, the lid unit is in abutment with the box unit at an end portion thereof, so as to cover the remaining portion of the opening.

18 Claims, 8 Drawing Sheets

U.S. PATENT DOCUMENTS

| | | | |
|---|---|---|---|
| 6,883,852 B2 * | 4/2005 | Laskey | 296/37.8 |
| 6,942,267 B1 * | 9/2005 | Sturt | 296/24.34 |
| D522,957 S * | 6/2006 | Miyashita | D12/424 |
| 7,168,669 B2 * | 1/2007 | Park | 248/311.2 |
| D538,737 S * | 3/2007 | Scully | D12/421 |
| 2001/0020620 A1 * | 9/2001 | Katagiri et al. | 220/345.2 |
| 2001/0030436 A1 * | 10/2001 | Kifer et al. | 296/24.1 |
| 2002/0089203 A1 * | 7/2002 | Flowerday et al. | 296/37.8 |
| 2003/0155786 A1 * | 8/2003 | Kim et al. | 296/24.1 |
| 2004/0080173 A1 * | 4/2004 | Niwa et al. | 296/24.34 |
| 2007/0102463 A1 * | 5/2007 | Thomas | 224/275 |
| 2007/0152461 A1 * | 7/2007 | Joler et al. | 296/24.34 |

FOREIGN PATENT DOCUMENTS

| | | | |
|---|---|---|---|
| DE | 10 2004 029 864 | 1/2006 | |
| JP | 57164821 A * | 10/1982 | 224/543 |
| JP | 05193417 A * | 8/1993 | 224/542 |
| JP | 05338497 A * | 12/1993 | 296/37.14 |
| JP | 9-169243 | 6/1997 | |
| JP | 10-129328 | 5/1998 | |

* cited by examiner

AUTOMOTIVE STORAGE APPARATUS

This application claims priority under 35 USC 119 from Japanese patent document, JP 2005-222752, filed Aug. 1, 2005, the disclosure of which is incorporated by reference herein.

BACKGROUND OF THE INVENTION

1. Technical Field

The present invention relates to an automotive storage apparatus and more particularly to an automotive storage apparatus which can make itself more convenient for use.

2. Related Art

In an automotive storage apparatuses which are provided in passenger compartments of motor vehicles in the related art, there is disclosed an automotive storage apparatus in which a storage portion which opens upwards is formed in part of an armrest of a motor vehicle. A covering/uncovering door is provided that slides along an opening in the storage portion and covers and uncovers the opening (refer to, for example, JP-A-9-169243). In addition, a drink container holder is disclosed in which drink containers of different sizes are formed by sliding a holding member provided in an opening in a storage portion which opens upwards (refer to, for example, JP-A-10-129328).

Incidentally, while automotive storage apparatuses become more convenient for use when they are made to store various types of articles, one of the aforesaid storage apparatuses is used only to store small items, whereas the other storage apparatus is used only as a drink container holder. Hence, neither of them can be said to be convenient for use.

Consequently, an object of the invention is to provide an automotive storage apparatus which can make itself more convenient for use by making itself contain various types of articles.

SUMMARY OF THE INVENTION

With a view to accomplishing the object, according to a first aspect of the invention, there is provided an automotive storage apparatus (for example, an automotive storage apparatus 15 in an embodiment) having a storage apparatus main body (for example, a storage apparatus main body 28 in the embodiment) in which an opening (for example, an opening 52 in the embodiment) which opens upwards can be covered and uncovered by a slidable lid unit (for example a shutter 41 in the embodiment), the automotive storage apparatus having a box unit (for example, a box unit 70 in the embodiment) adapted to be detachably installed in the storage apparatus main body in such a manner as to cover part of the opening when installed, wherein the lid unit is brought into abutment with the box unit at an end portion thereof so as to cover a remaining part of the opening in such a state that the box unit is installed in the storage apparatus main body.

According to a second, ninth and tenth aspect of the invention, there is provided an automotive storage apparatus as set forth in the first aspect of the invention, wherein a partition member (for example, a partition plate 55 in the embodiment) is provided on the storage apparatus main body which slides below the lid unit and which can be situated at a position where the partition member divides equally the remaining part of the opening which is left uncovered when the box unit is installed in the storage apparatus main body and also at a position where the partition member divides equally the whole of the opening which is left uncovered when the box unit is removed.

According to a third aspect of the invention, there is provided an automotive storage apparatus as set forth in the second aspect of the invention, wherein the partition member has a swinging flap (for example, flaps 57, 58 in the embodiment) which is biased in a sliding direction of the partition member.

According to a fourth aspect of the invention, there is provided an automotive storage apparatus as set forth in the first aspect of the invention, wherein the lid unit is provided in such a manner as to be accommodated endways at one end edge side of the opening, and wherein the box unit covers the other end edge side of the opening when installed in the storage apparatus main body.

According to a fifth aspect of the invention, there is provided an automotive storage apparatus as set forth in the fourth aspect of the invention, wherein the box unit has a protruding portion (for example, a protruding plate portion 94 in the embodiment) which protrudes towards the one end edge side when installed in the storage apparatus main body.

According to a sixth aspect of the invention, there is provided an automotive storage apparatus as set forth in the fifth aspect of the invention, wherein the box unit has below the protruding portion a raising portion (for example, a locking raising portion 97 in the embodiment) which protrudes in the same direction as the direction in which the protruding portion protrudes.

According to a seventh aspect of the invention, there is provided an automotive storage apparatus as set forth in the fifth aspect of the invention, wherein the protruding portion has an engagement portion (for example, an engaging raising portion 96 in the embodiment) which can be brought into engagement with an end portion of the lid unit.

According to an eighth aspect of the invention, there is provided an automotive storage apparatus as set forth in the first aspect of the invention, wherein the lid unit and the box unit become flush with each other at main upper surfaces (for example, main upper surfaces 102, 103 in the embodiment) thereof in such a state that the lid unit and the box unit are in abutment with each other.

According to an eleventh aspect of the invention, there is provided an automotive storage apparatus as set forth in second aspect of the invention, wherein the partition member comprises a swinging flap which is swingably attached to the partition member and is biased so as to be parallel with the lid unit.

According to the first aspect of the invention, when the box unit is not installed in the storage apparatus main body, the storage apparatus main body can be used as a large storage space as it is. Whereas when the box unit is installed in the storage apparatus main body, the box unit and the remaining portion of the storage apparatus main body can be used as separate independent storage spaces. In this way, the storage space can be divided or can be left undivided by installing or removing the box unit as required. Thus various types of articles can be stored therein and the convenience for use is thereby increased. Moreover, when the box unit is not installed in the storage apparatus main body, the opening which opens upwards of the storage apparatus main body can be covered by the lid unit. When the box unit is installed in the storage apparatus main body, by sliding the lid unit so that an end portion thereof abuts the box unit, the remaining portion of the opening that is left uncovered after installation of the box unit can be covered. Consequently, whether or not the box unit is installed in the storage apparatus main body, the opening in the storage apparatus main body can be covered by the lid unit. In addition, when the box unit is installed in the storage apparatus main body, an article can be placed in or taken out of the box unit without opening the lid unit. Consequently, the convenience for use can be increased without sacrificing the functionality.

According to the second aspect of the invention, with the partition member can be disposed at the position where the partition member equally divides the remaining portion of the opening in the storage apparatus main body excluding the portion of the opening which is covered by the box unit. Thus, drink containers which are relatively small and are of the same size can be held firmly on both sides of the partition member. In addition, the partition member can be disposed at the position where the partition member equally divides the whole of the opening in the storage apparatus main body which results after the box unit is removed. Then, drink containers which are relatively large and are of the same size can be held firmly on both the sides of the partition member. Since the partition member is provided below the lid unit, once the lid unit is closed, the partition member can be covered, thereby making it possible to obtain a good appearance.

According to the third aspect of the invention, when the flap of the partition member swings while storing a drink container in the storage space, a biasing force is applied to the drink container from the flap. The drink container is thus pressed against an opposite side of the storage apparatus main body from the partition member and is held firmly. In addition, a plurality of types of drink containers which are different in size can be accommodated by changing the swing angle of the flap. Consequently, each of the plurality of drink containers which are different in size can be held properly.

According to the fourth aspect of the invention, the lid unit is retractable towards an edge side of one end of the opening in the storage apparatus main body and the box unit covers the edge side of the other end of the opening when installed in the storage apparatus main body. Thus, the whole of the remaining portion of the opening in the storage apparatus main body excluding the box unit can be covered by the lid unit, thereby making it possible to obtain a good appearance when the remaining opening portion is so covered.

According to the fifth aspect of the invention, since the box unit has the protruding portion which protrudes towards the edge side of one end of the opening when installed in the storage apparatus main body, the installation of the box unit into the storage apparatus main body in the reverse direction can be restricted, thereby making it possible to prevent the erroneous installation of the box unit. In addition, when a drink container is stored in the storage space on the storage apparatus main body side, the drink container can be held well by this protruding portion.

According to the sixth aspect of the invention, since the box unit has a raising portion protrudes in the same direction as the protruding portion below the protruding portion, a drink container, for example, can be held by both the upper protruding portion and the lower raising portion. Thus the drink container can be held better without falling down. In addition, when attempting to remove the box unit, the finger or fingers can be easily hooked on the raising portion, so as to facilitate the removal of the box unit.

According to the seventh aspect of the invention, since the engagement portion engages with the end portion of the lid unit when the lid unit is closed, the closed state of the lid unit can be maintained well.

According to the eighth aspect of the invention, since the main upper surfaces of the lid unit and the box unit become flush with each other when the lid unit abuts the box unit, the storage apparatus is allowed to obtain a better appearance.

DETAILED DESCRIPTION OF THE PREFERRED EMBODIMENTS

An automotive storage apparatus according to an embodiment of the invention will be described below by reference to the drawings.

Figure 1:
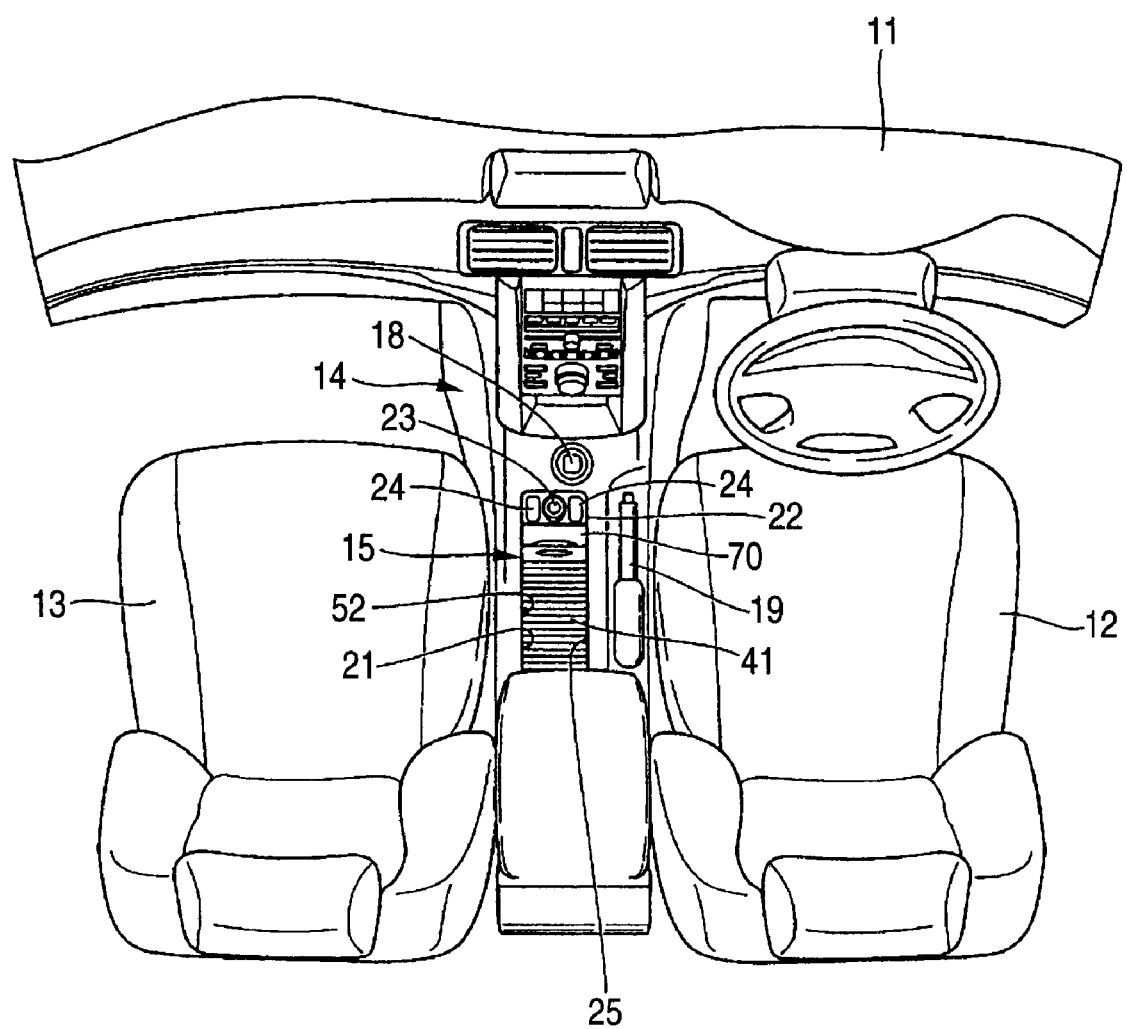
FIG. 1 is a partial plan view of a passenger compartment of a vehicle to which an automotive storage apparatus according to an embodiment of the invention is applied.

FIG. 1 shows an interior of the passenger compartment of a motor vehicle, in which there is provided a center console 14 which extends from a laterally central part of an instrument panel 11 to the rear of the vehicle while passing between a driver's seat 12 and a front passenger's seat 13. An automotive storage apparatus 15 of the present embodiment is applied to a console box of this center console 14. Note that when used in the following description, "longitudinal or longitudinally" mean, respectively, longitudinal or longitudinally with respect to the vehicle.

A gear selector lever or shift lever 18 is provided on a front upper surface of the center console 14. A parking brake lever 19 is provided on a driver's seat 12 side of part of the center console 14 which lies further rearward than the shift lever 18. In addition, a longitudinally elongated upper hole portion 21 is provided in an upper surface of another part of the center console 14 which lies further rearward than the shift lever 18 and closer to the front passenger's seat 13 than the parking brake lever 19. A switch unit 22 is fixedly placed in the upper hole portion 21 to cover a front end portion of the hole. This switch unit 22 has a cigar lighter 23 situated laterally centrally and control switches 24 are provided on both sides of the cigar lighter 23.

Figure 2:
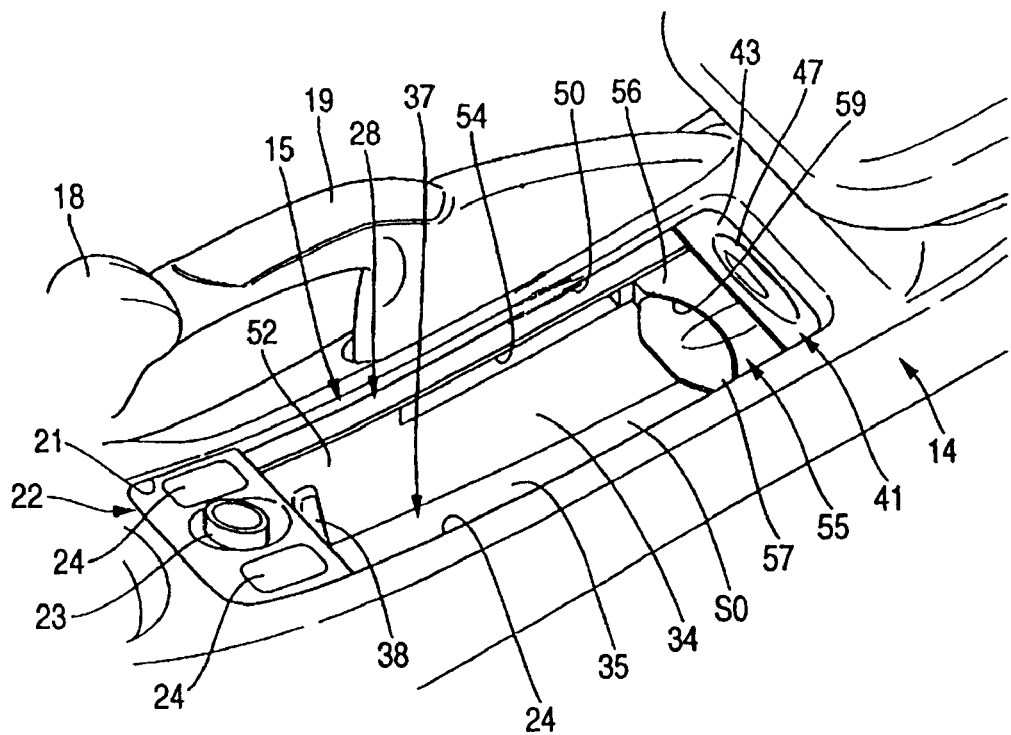
FIG. 2 is a perspective view showing the automotive storage apparatus according to the embodiment of the invention in which a shutter is fully opened and a box unit is not installed.
Figure 3:
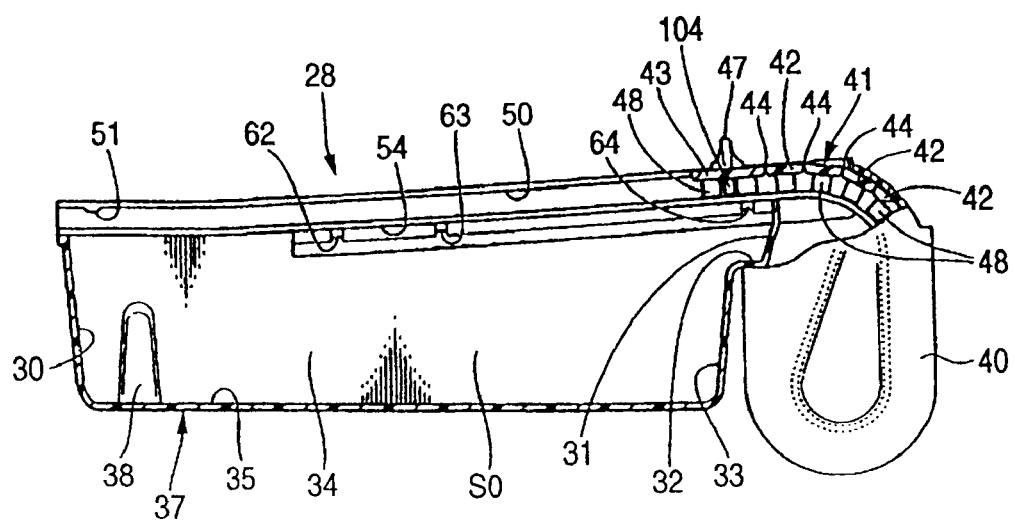
FIG. 3 is a side sectional view of a storage apparatus main body of the automotive storage apparatus according to the embodiment of the invention.

Then, as shown in FIG. 2, assuming that the remaining portion of the upper hole portion 21 which excludes the switch unit 22 is a mouth portion 25, a storage apparatus main body 28 of the automotive storage apparatus 15 of this embodiment is provided in the position of this mouth portion 25. This storage apparatus main body 28 includes a storage case 37 having, as shown in FIG. 3, a front surface portion 30 which extends downwards from the position of a rear edge portion of the switch unit 22 which is a front edge portion of the mouth portion 25 while extending laterally, a rear end face portion 31 which extends slightly downwards from a position which is slightly further forward than a rear edge portion of the mouth portion 25 while extending laterally, a step-like surface portion 32 which extends slightly forward from a lower end edge portion of the rear end face portion 31 while extending horizontally, a rear surface portion 33 which extends downwards from a front end edge portion of the rear end face portion 31 while extending laterally, a pair of side surface portions 34 which extend downward, respectively, from positions of both side edge portions of the mouth portion 25 which lie to face each other laterally, and a bottom surface portion 35 which is disposed horizontally inside the front surface portion 30, the rear surface portion 33 and the pair of side surface portion in such a manner as to connect together lower edge portions thereof. A storage space S0 is formed in the storage case 37 by the front surface portion 30, the rear end face portion 31, the step-like surface portion 32, the rear surface portion 33, the pair of side surface portions 34 and the bottom surface portion 35 in such a manner as to be recessed downwards. A guide protruding portion 38 is provided on one of the side surface portions 34 at a portion thereof which lies close to the front surface portion 30 and the bottom surface portion 35 in such a manner as to protrude laterally inward, and this guide protruding portion 38 is formed into a taper shape which tapers as it extends upward from the bottom surface portion 35.

In the storage case 37, a shutter accommodating portion 40 is provided further rearward than the rear surface portion 33, the step-like surface portion 32 and the rear end face portion 31. A shutter (the lid unit) 41 which makes up the storage apparatus main body 28 is provided in such a manner as to be accommodated in this shutter accommodating portion 40. Here, this shutter 41 is made up of a plurality of laterally elongated plate-like small piece portions 42 which are rotatably connected to each other in such a manner as to form a plate. A plate-like control piece portion 43, which is made slightly wider than the small piece portions 42, is provided at one end of the shutter 41. The plurality of small piece portions 42 and the control piece portion 43 are connected together by connecting portions 44 on the same side as viewed in a thickness direction, and facing sides thereof are inclined so as to be spaced apart from the adjacent sides as they extend farther from the connecting portions 44. The shutter 41 can thereby be curved with a connecting portion 44 side thereof facing outside. In addition, the shutter 41 is accommodated endwise into the shutter accommodating portion 40 from an opposite end portion to the control piece portion 43 while curved properly.

A gripping raising portion 47, which is adapted to be gripped with the fingers of an occupant when he or she attempts to operate the shutter 41, is fixed to an upper surface of the control piece portion 43 in such a manner as to extend latterly. In addition, a plurality of guide portions 48, which extrude laterally outward, are provided longitudinally at intervals on an opposite side of the shutter 41 to a side thereof where the gripping raising portion 47 is provided.

Figure 4:
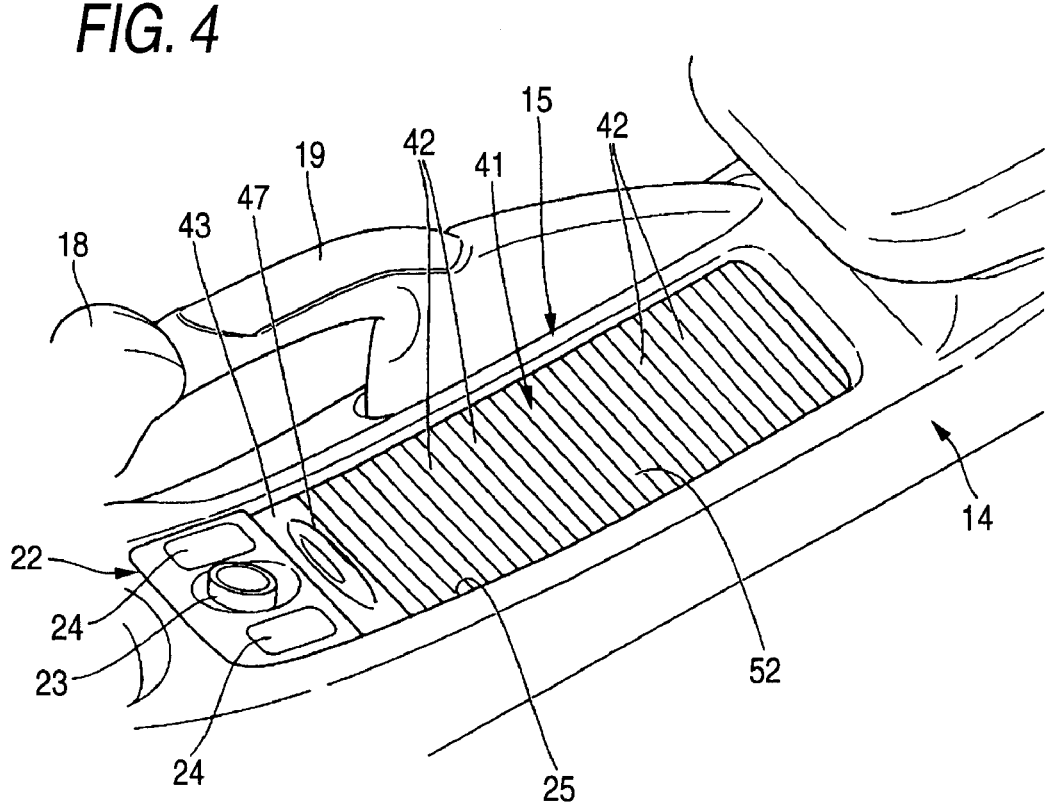
FIG. 4 is a perspective view showing the automotive storage apparatus according to the embodiment of the invention in which the shutter is fully closed and the box unit is installed.

A shutter guide groove 50 is formed substantially horizontally from the shutter accommodating portion 40 to the front edge portion of the mouth portion 25 on an upper edge side of each of the pair of side surface portions 34 in such a manner as to extend longitudinally in a straight line. In addition, these shutter guide grooves 50 extend further from the side surface portions 34 into the shutter accommodating portion 40 and are then formed into such a curved shape as to match the shape of the shutter accommodating portion 40 in the shutter accommodating portion 40. Then, the individual guide portions 48 of the shutter 41 are slidably fitted in the shutter guide grooves 50. When the gripping raising portion 47 is gripped by the fingers of the occupant so as to pull out the shutter 41 forward from the shutter accommodating portion 40, the plurality of guide portions 48 of the shutter 41 slide along the shutter guide grooves 50. The control piece portion 43 and the plurality of small piece portions 42, which lie above the guide portions 48, are made to extend horizontally as a whole as shown in FIG. 4. A front end edge portion of the shutter 41 is brought into abutment with a rear surface of the switch unit 22 without any gap to thereby cover the whole of the mouth portion 25. As this occurs, the guide portions 48 which lie at a frontmost end of the shutter 41 ride over projecting portions 51, which project downward from upper surfaces of the shutter guide grooves 50 at front end portions thereof as shown in FIG. 3, and at the same time are brought into abutment with the switch unit 22. As a result, when the frontmost guide portions 48 attempt to ride back over the projecting portions 51, they need a slightly large operation force for their elastic deformation, and hence, the shutter 41 is temporarily locked in a closed state in this way.

On the other hand, when the gripping raising portion 47 is gripped by the fingers of the occupant so that the shutter 41 is pushed back to the rear and the guide portions 48 ride over the projecting portions 51, the guide portions 48 of the shutter 41 slide along the shutter guide grooves 50. Then the small piece portions 42 are sequentially accommodated into the shutter accommodating portion 40 from one lying opposite to the control piece portion 43, and as a result, the mouth portion 25 which lies further forward than the control portion 43 is uncovered. Here, as shown in FIG. 2, even when the mouth portion 25 is uncovered to a maximum extent, the control piece portion 43 still lies within the mouth portion 25 and is never accommodated into the shutter accommodating portion 40. A front end portion of the control piece portion 43 aligns substantially with a lower side of the rear surface portion 33 as viewed in the longitudinal direction, as shown in FIG. 3.

Thus, an opening in the mouth portion 25 which results when the shutter 41 uncovers the mouth portion 25 to the maximum extent, which is a portion existing between the switch unit 22 and the shutter 41 withdrawn to its maximum extent, constitutes an opening 52 in the storage apparatus main body 28 which opens upwards. This opening 52 is made to be covered and uncovered by the shutter 41 which can be accommodated into the shutter accommodating portion 41 provided at a rear end edge side (edge side of one end, or one edge side) of the opening 52 and which can slide.

A partition plate guide groove 54 is formed below and in parallel with the shutter guide groove 50 on each of the pair of side surface portions 34 to extend from the position where the rear end face portion 31 lies to an intermediate position on the way to the front surface portion 30, as shown in FIG. 3. Both end portions of a partition plate (the partition member) 55, shown in FIG. 5, of the storage apparatus main body 28 are made to fit slidably in these partition plate guide grooves 54 in such a posture or manner as to extend horizontally, whereby the partition plate 55 slides below the shutter 41 in a closed state. This partition plate 55 has a partition plate main body 56 which is slidably supported in the partition grooves 54 at both end portions thereof, a pair of flaps 57, 58 which are supported on front and rear sides of a laterally central portion of the partition plate main body 56 in such a manner as to swing, respectively, and a spring, not shown, for biasing the flaps 57, 58 individually outward of the partition plate main body 56 in sliding directions. That is, the swinging flap which is swingably attached to the partition member and is biased so as to be parallel with the lid unit (also see FIG. 11). Here, guide recessed portions 59, 60 are formed on the front and rear sides of the partition plate main body 56 at the laterally center thereof in such a manner as to be recessed in an arc-like fashion. The flaps 57, 58 are provided in positions which correspond to the positions where the guide recessed portions 59, 60 are provided, respectively, whereby when the flaps are caused to swing downward against the biasing force of the spring, the flaps 57, 58 come to be aligned with bottom portions of the guide recessed portions 59, 60, respectively.

Figure 5:
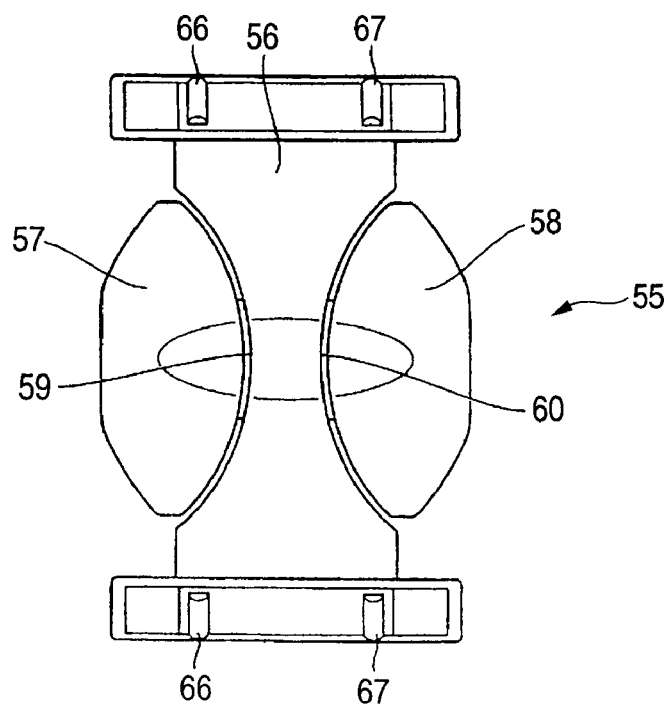
FIG. 5 is a plan view of a partition plate of the automotive storage apparatus according to the embodiment of the invention.

As shown in FIG. 3, a plurality of, or, specifically, three positioning recessed portions 62 to 64 are formed on each of the partition plate guide grooves 54. In association with this, as shown in FIG. 5, front and rear positioning raising portions 66, 67 are each formed on the partition plate main body 56 in such a manner as to fit in those positioning recessed portions 62 to 64. Once either of the pairs of positioning raising portions 66, 67 fits in any of the positioning recessed portions 62 to 64, when attempting to release the fitting thereafter, a slightly large operation force is necessary to elastically deform the raising portions. Accentuating the operating force in this way serves to position and maintain the partition plate main body 56 in positions. When the partition plate 55 is located at rear end positions of the partition plate guide grooves 54 which lie at rearmost ends thereof, the rear pair of positioning raising portions 67 is made to fit in the rearmost pair of positioning recessed portions 64. As this occurs, as shown in FIG. 2, the partition plate 55 slides to lie below the shutter 41 which uncovers the opening 52 to the maximum extent and stops in such a state that part of the partition plate 55 protrudes slightly forward from the shutter 41. In addition, when the partition plate 55 is located at front end positions of the partition plate guide grooves 54 which lie at frontmost ends thereof, the front pair of positioning raising portions 66 is made to fit in the frontmost pair of positioning recessed portions 62. As this occurs, the partition plate 55 is located at a position where the partition plate 55 divides the whole of the opening 52 into two halves or a position where the partition plate 55 divides a portion between the front surface portion 30 and the rear surface portion 33 into two halves. Furthermore, when the partition plate 55 is located at an intermediate stop position which constitutes the second pair from the front where the front pair of positioning raising portions 66 is made to fit in the pair of positioning recessed portions 63, the partition plate 55 stops at a position which lies a predetermined distance closer to the rear surface portion 33 than the position where the opening 52 is divided into two halves. Namely, the partition plate 55 is allowed to stop at sliding positions in a plurality of stages or specifically in three stages.

Figure 6:
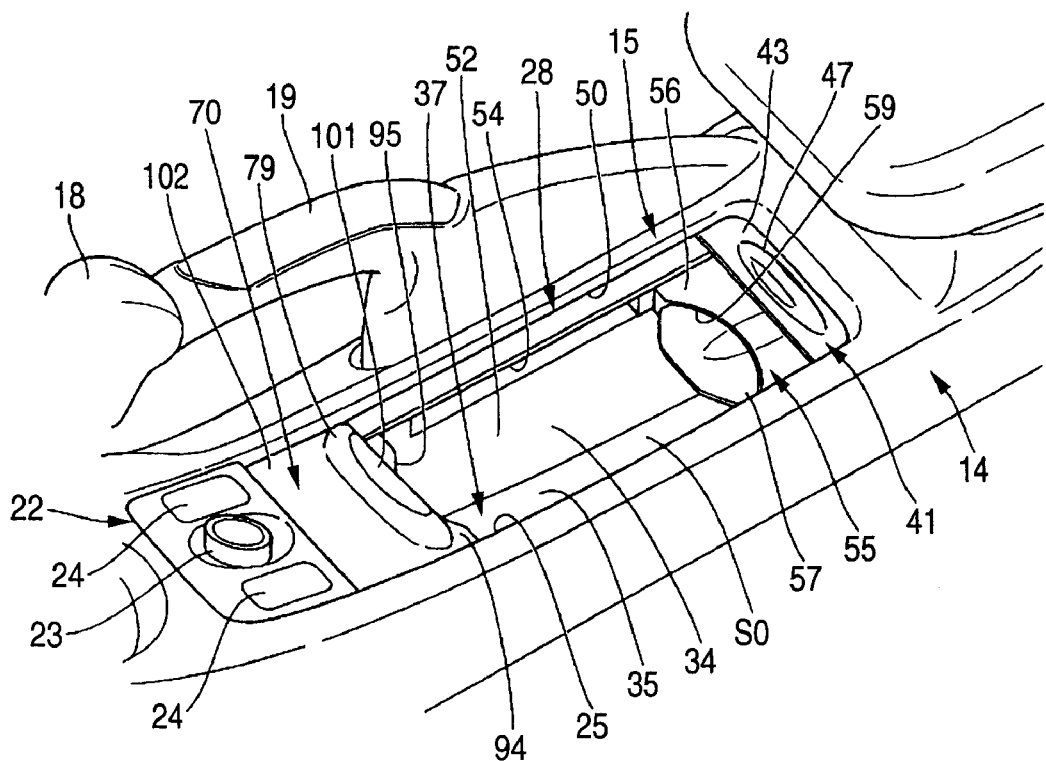
FIG. 6 is a perspective view showing the automotive storage apparatus according to the embodiment of the invention in which the shutter is fully opened and the box unit is installed.
Figure 7:
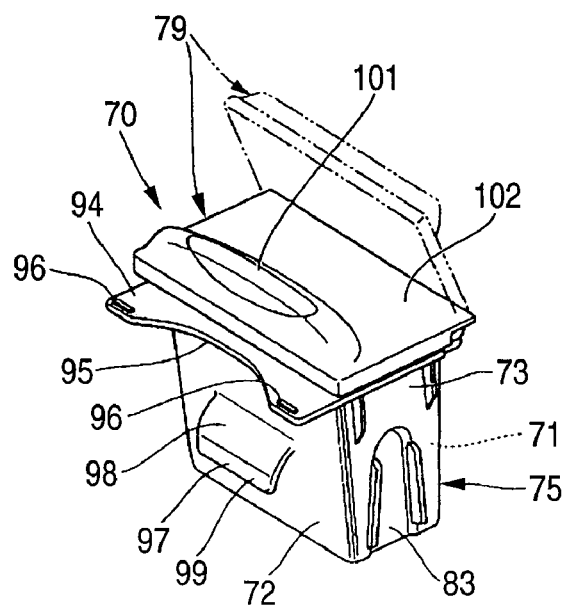
FIG. 7 is a perspective view of the box unit of the automotive storage apparatus according to the embodiment of the invention.
Figure 8:
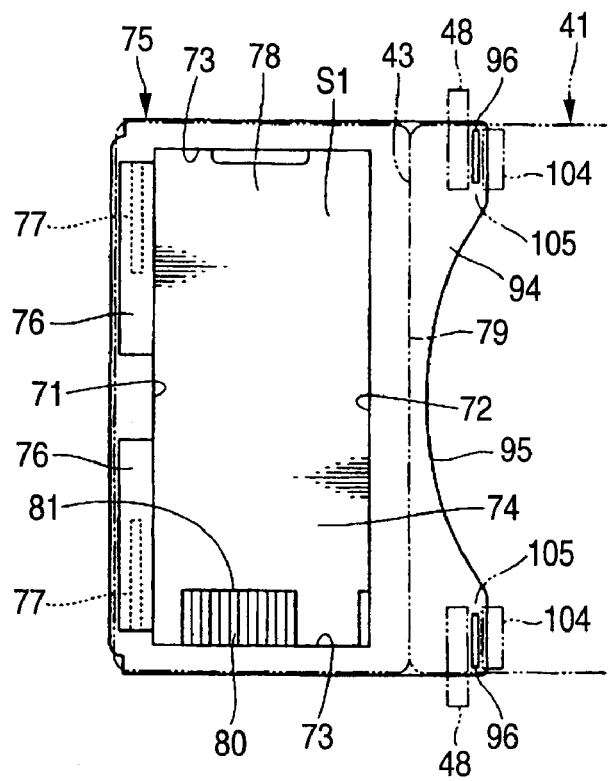
FIG. 8 is a plan view of a box unit main body of the automotive storage apparatus according to the embodiment of the invention.

In addition, as shown in FIGS. 6 and 7, the automotive storage apparatus 15 of the present embodiment has a box unit 70 which can be installed into and removed from the storage apparatus main body 28. This box unit 70 has, as shown in FIG. 8, an integrally formed box unit main body 75 which has a front wall portion 71 and a rear wall portion 72 which are substantially parallel with each other, a pair of side wall portions 73 which connect the front and rear wall portions together at both sides thereof, and a bottom plate portion 74 which extends in such a manner as to connect the front wall portion 71, the rear wall portion 72 and the pair of side wall portions 73 together along end edge portions thereof. The box unit 70 is recessed inward to form a recessed storage space S1 and a lid portion 79 which is connected to support portions 76 provided on an end edge portion of the front wall portion 71 of the box unit main body 75 which lies opposite to an end edge portion thereof. The lid portion 79 connects thereto in such a manner as to rotate about shafts 77 which extends in the support portions 76 in such a manner as to extend along the end edge portion so as to cover and uncover an opening 78 in the box unit main body 75. The box unit 70 is such as to be used as an ashtray or a compartment which contains small items, and when it is used as an ashtray, an interior thereof is formed into a suitable shape to the ashtray, whereas when it is used as a compartment which contains small items, the interior thereof is formed into a suitable shape to the small items container. In addition, FIG. 8 shows an application where the box unit 70 is used as an ashtray, a protruding portion 81 having on an upper surface thereof a surface portion 80 on which a lit cigarette is extinguished is formed on one of the side wall portions 73 in such a manner as to protrude inward.

Figure 9:
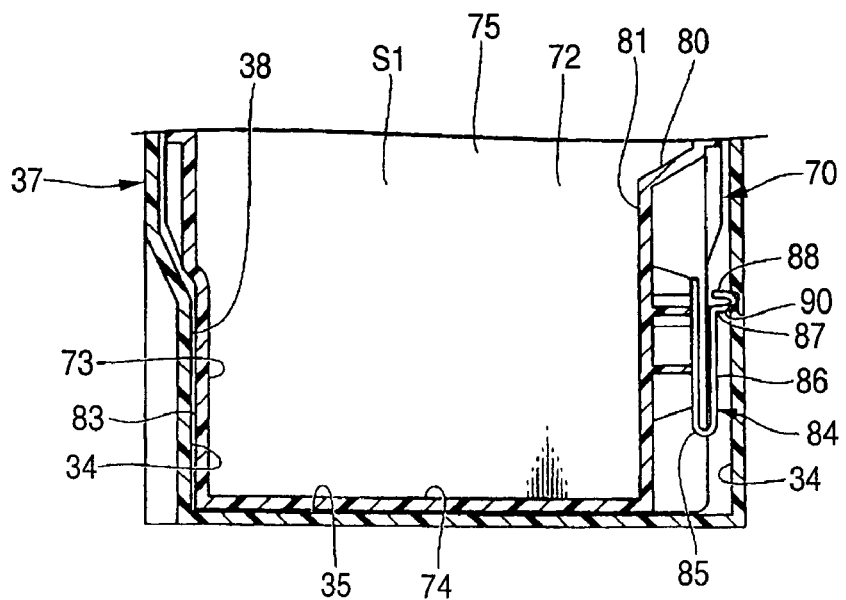
FIG. 9 is a front sectional view showing the automotive storage apparatus according to the embodiment of the invention in which the box unit is installed in the storage apparatus main body.

As shown in FIG. 7, a guide groove 83 is formed on an outside of one of the side wall portions 73 of the box unit main body 75 which is recessed inward and narrows as it extends from a bottom plate portion 74 side toward a lid portion 79 side of the relevant side wall portion 73. A leaf spring 84 is mounted on an outside of the other side wall portion 73 as shown in FIG. 9. This leaf spring 84 has a first beam portion 85 which is attached to the box main body unit 75, a second beam portion 86 which is folded outward from a bottom plate portion 74 side of the first beam portion 85 in such a manner as to extend away from the bottom plate portion 74, a third beam portion 87 which is bent outward from an opposite end of the second beam portion 86 to the first beam portion 85, and a fourth beam portion 88 which is folded back from a distal end of the third beam portion 87 in an opposite direction to the second beam portion 86.

In addition, the box unit 70 is inserted from above into a front edge side of the opening 52 in the storage apparatus main body 28 as shown in FIG. 6 so that the bottom plate portion 74 is made to face downward and the front wall portion 71 is made to face forward. As this occurs, by inserting as shown in FIG. 9, the guide protruding portion 38 shown in FIG. 3 as formed on the side surface portion 34 of the storage case 37 into the guide groove 83 shown in FIG. 7, the box unit 70 is fitted in the opening 52 while being positioned relative to the opening 52. When the box unit 70 is inserted into the storage case 37 to a lowest side, a portion of the leaf spring 84 which constitutes a boundary between the third beam portion 87 and the fourth beam portion 88 fits in a locking recessed portion 90 formed on the side surface portion 34 of the storage case 37 and is then locked therein by virtue of the biasing force of the leaf spring 84. In an installed state where the box unit 70 is locked on the storage case 37 in this way, the box unit 70, as shown in FIG. 6, covers part of the front end edge side (the other end edge side) of the opening 52 and part of the storage space S0 therebelow, and moreover, the box unit 70 is disposed in such a manner as to produce no gap with the front edge of the opening 52.

A protruding plate portion (the protruding portion) 94 is integrally formed on the box unit main body 75 of the box unit 70 to protrude horizontally from an upper edge portion of the rear wall portion 72 to the rear or the rear end edge side of the opening portion 52 when the box unit 70 is installed in the storage apparatus main body 28. As shown in FIG. 7, a guide recessed portion 95 is formed at a laterally center of the protruding plate portion 94 to be recessed in an arc-like fashion, and engaging raising portions 96 (the engagement portion) are integrally formed on the protruding plate portion 94 at positions laterally outward of the guide recessed portion 95 to protrude upward.

In addition, a locking raising portion (the raising portion) 97 is integrally formed on the box unit main body 75 of the box unit 70 to protrude from a position on the rear wall portion 72 which lies lower than the protruding plate portion 94 to the rear or in the same direction that protruding plate portion 94 protrudes when the box unit 70 is installed in the storage apparatus main body 28. This locking raising portion 97 has a curved plate portion 98 which protrudes obliquely downward from the rear wall portion 72 while being curved and an abutment plate portion 99 which extends downward from a distal end of the curved plate portion 98 to form a flat plate. Its rear end position aligns substantially with the position of the bottom portion of the guide recessed portion 95 of the protruding plate portion 94. This locking raising portion 97 is formed into a shape which allows the finger to be hooked therearound from below.

The lid portion 79 of the box unit 70 has a controlling raising portion 101 formed laterally thereon on a rear side thereof that protrudes upwards when the box unit 70 is installed in the storage apparatus main body 28 with the lid portion 79 closed. A main upper surface 102 is disposed horizontally which constitutes the same plane which is made up of the remaining widest area which excludes the controlling raising portion 101.

Figure 10:
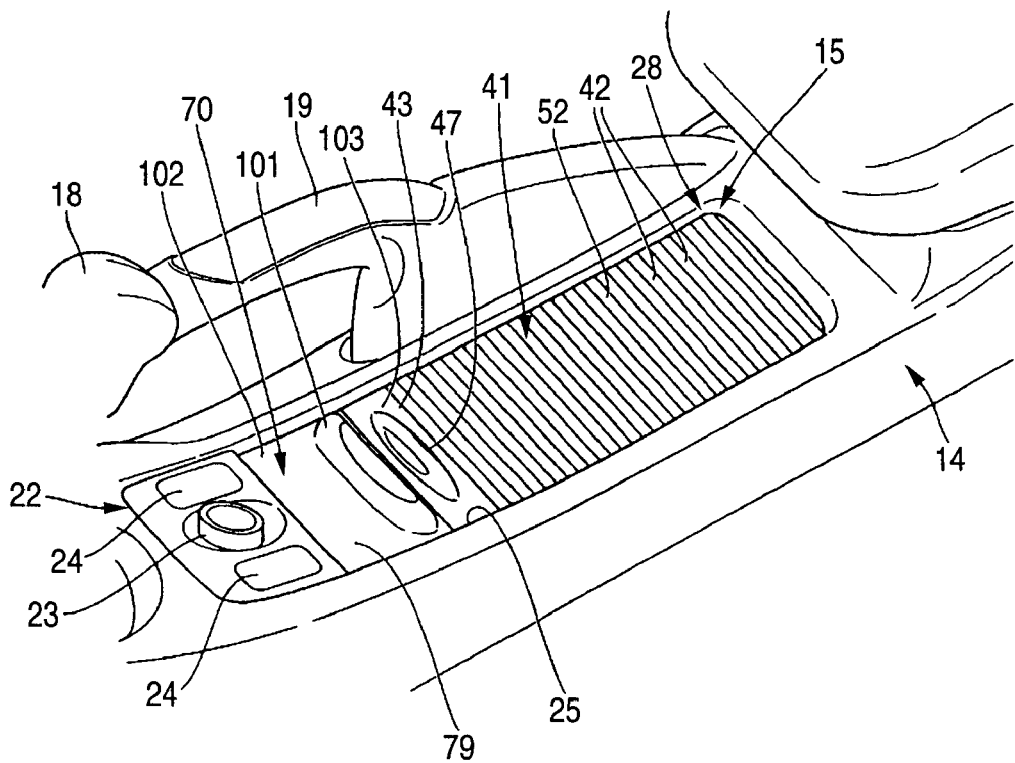
FIG. 10 is a perspective view showing the automotive storage apparatus according to the embodiment of the invention in which the box unit is not installed and the shutter is fully closed.

Then, when the shutter 41 is pulled out from the shutter accommodating portion 40 to slide towards the box unit 70 side with the box unit 70 installed in place, a front end edge portion side of the shutter 41 moves over the protruding plate portion 94 of the box unit 70. The front end edge portion of the shutter 41 is brought into abutment with the lid portion 79 of the box unit 70 as shown in FIG. 10, to form a closed state without any gap therebetween. Then, in addition to the part of the opening 52 which is covered by the box unit 70, the remaining portion of the opening 52 is covered by the shutter 41. Namely, even when the box unit 70 is installed in place, the shutter 41 can be closed to provide a good appearance.

In addition, when the shutter 41 advances to the position where the front end edge portion of the shutter 41 abuts the lid portion 79 of the box unit 70 in a closed state so that there is no gap between, the guide portions 48 of the shutter portion 41 which lie at the frontmost end side of the shutter 41 ride over, as shown in FIG. 8, the engaging raising portions 96 on the protruding plate portion 94 and allow the engaging raising portions 96 to engage with engaging recessed portions 105 formed therebehind between the stopper portions 104. In this state, the slightly large operation force is necessary to elastically deform the engaging raising portions 96 for the guide portions 48 to ride back over the engaging raising portions 96. Thus the shutter 41 is temporarily locked in its closed state. As this occurs, as shown in FIG. 10, the main upper surface 102 of the lid portion 79, which is in the closed state, of the box unit 70 which excludes the controlling raising portion 101 becomes flush with a main upper surface 103 of the shutter 41 which constitutes the same plane which is made up of the remaining widest area of the shutter 41 excluding the gripping raising portion 47. Here, in place of forming the engaging raising portions 96 on the protruding plate portion 94 in the way described above, for example, a construction may be adopted in which the protruding plate portion 94 has engaging recessed portions, while the shutter 41 has engaging raising portions which can be brought into engagement with the engaging recessed portions.

Next, modes in which the automotive storage apparatus 15 is used will be described individually below.

Firstly, when the box unit 70 is not installed in the storage apparatus main body 28, when the occupant grips the gripping raising portion 47 with his or her fingers so as to cause the shutter 41 to slide forward until the shutter 41 is brought into abutment with the switch unit 22, the state is produced in which the opening 52 is covered as shown in FIG. 4.

When the occupant grips on the gripping raising portion 47 with his or her fingers to cause the shutter 41 to slide backward from this state to thereby be accommodated into the shutter accommodating portion 40 properly, an open area of the opening 52 increases according to a sliding amount of the shutter 41. For example, as shown in FIG. 2, when the gripping raising portion 47 of the shutter 41 is withdrawn towards the shutter accommodating portion 40 to its maximum extent to produce a state where the opening 52 is uncovered to its maximum extent with the partition plate 55 withdrawn towards the shutter accommodating portion 40 to its maximum extent so as to be located at the aforesaid rear end position, a state is produced where the storage space S0 of the storage case 37 continues widest while including the opening 52. Thus, a relatively large article such as sunglasses, a purse, a remote controller of a car navigation system or the like can be stored therein.

Figure 11:
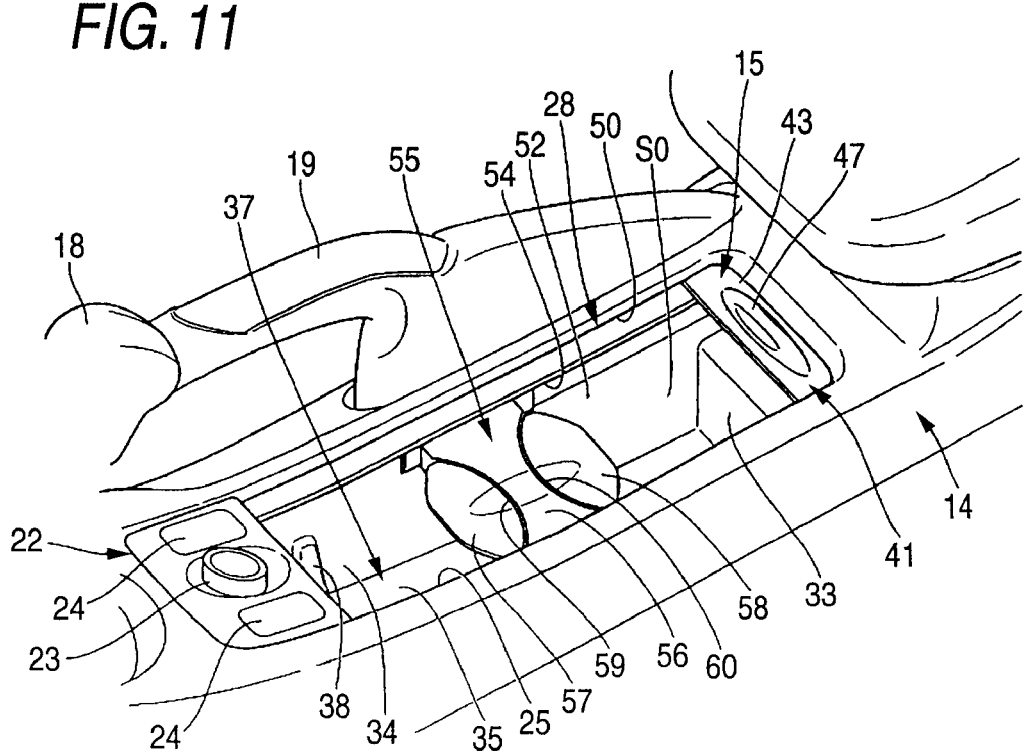
FIG. 11 is a perspective view showing the automotive storage apparatus according to the embodiment of the invention in which the box unit is not installed, the shutter is fully opened and the partition plate is disposed at a front end position.
Figure 12:
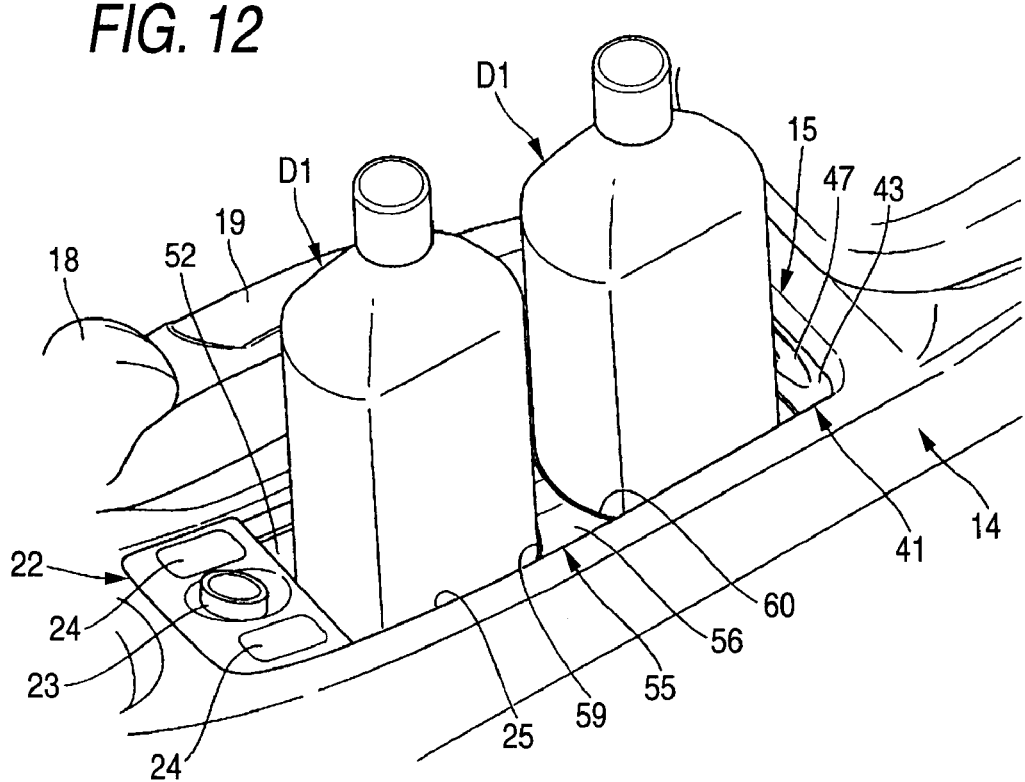
FIG. 12 is a perspective view showing a state in which drink containers of a large size are inserted into the automotive storage apparatus shown in FIG. 11.
Figure 13:
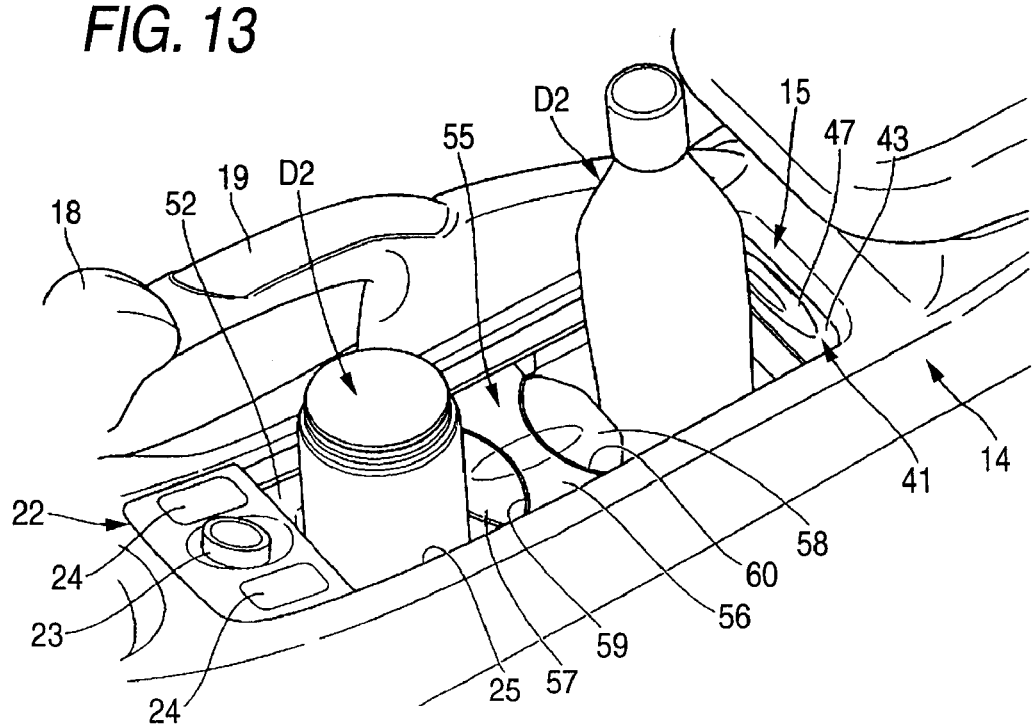
FIG. 13 is a perspective view showing a state in which drink containers of a small size are inserted into the automotive storage apparatus shown in FIG. 11.

In addition, with the box unit 70 not installed in the way described above so as to make the opening 52 widest, when the partition plate 55 is located at the front end position as shown in FIG. 11, the partition plate 55 is located at the position where the partition plate 55 divides the opening 52 into two halves and the portion resulting between the front surface portion 30 and the rear surface portion 33 into two halves. As this occurs, drink containers D1 of a first large size can be inserted into the storage apparatus main body 28 so as to be positioned longitudinally before and after the partition plate 55, as shown in FIG. 12. Here, when the drink container D1 is inserted between the partition plate 55 and the front surface portion 30, the drink container D1 comes to be placed on the bottom plate portion 35 while causing the front flap 57 of the partition plate 55 to swing downward against the biasing force of the spring and allowing a side portion thereof to enter the front guide recessed portion 59 of the partition plate 55. The drink container D1 so placed is then held between the front surface portion 30 and the flap 57 by virtue of the biasing force of the spring. Even if a drink container which is slightly smaller in size than the aforesaid one is inserted, the flap 57 is returned suitably due to the biasing force of the spring that presses the drink container against the front surface portion 30, and the drink container is held between the front surface portion 30 and the flap 57. In addition, when the drink container D1 of the first size is inserted between the partition plate 55 and the rear surface portion 33, the drink container D1 comes to be placed on the bottom plate portion 35 while causing the rear flap 58 of the partition plate 55 to swing downward against the biasing force of the spring and allowing a side portion thereof to enter the rear guide recessed portion 60 of the partition plate 55. The drink container D1 so placed is then held between the rear surface portion 33 and the flap 58 by virtue of the biasing force of the spring. Also, if the drink container which is slightly smaller in size than the aforesaid one is inserted, the flap 58 is returned due to the biasing force of the spring so as to press the drink container against the rear surface portion 33, whereby the drink container is held between the rear surface portion 33 and the flap 58. In addition, when the partition plate 55 is located at the front end position in such a state that the opening 52 is uncovered to its maximum extent without installing the box unit 70, drink containers D2 of a second smaller size can be inserted before and after the partition plate 55, respectively, without causing the flaps 57, 58 to swing, as shown in FIG. 13. Namely, when this drink container D2 is inserted between the partition plate 55 and the front surface portion 30, the drink container D2 comes to be placed on the bottom surface portion 35 while being supported between the flap 57 of the partition plate 55 which is being in the horizontal state and the front surface portion 30. Similarly, when this drink container D2 is inserted between the partition plate 55 and the rear surface portion 33, the drink container D2 comes to be placed on the bottom portion 35 while being supported between the flap 58 of the partition plate 55 which is in the horizontal state and on the rear surface portion 33.

Furthermore, when the partition plate 55 is located at the intermediate stop position when the opening 52 is uncovered to its maximum extent without installing the box unit 70, the drink container D2 of the second smaller size can be inserted in the storage apparatus main body 28 on the rear side of the partition plate 55. When the drink container D2 is inserted between the partition plate 55 and the rear surface portion 33, the drink container D2 comes to be placed on the bottom plate portion 35 while causing the rear flap 58 of the partition plate 55 to swing downward against the biasing force of the spring and allowing a side portion thereof to enter the rear guide recessed portion 60 of the partition plate 55. The drink container D2 is then held between the rear surface portion 33 and the flap 58 by virtue of the biasing force of the spring. In this state, a relatively large storage space can be secured forward of the partition plate 55 in the storage apparatus main body 28.

Next, in the present embodiment where the box unit 70 is installed in the storage apparatus main body 28, the shutter 41 is caused to slide to uncover at least a front part of the opening 52. The box unit 70 is inserted into the storage apparatus main body 28 in a posture in which the front wall portion 71 is made to face forward while the guide protruding portion 38 is inserted into the guide groove 83. Then, as shown in FIG. 9, the leaf spring 84 enters the locking recessed portion 90, whereby the box unit 70 is locked in the storage apparatus main body 28 by virtue of the biasing force of the leaf spring 84. Note that even when the box unit 70 is attempted to be inserted with the rear wall portion 72 made to face forward, the protruding plate portion 94 which is shown in FIG. 7 as protruding outward from the rear wail portion 72 comes to interfere with the switch unit 22, and hence, the box unit 70 cannot be installed, and erroneous installation of the box unit 70 being thereby prevented.

Thus, when the box unit 70 is installed in the storage apparatus main body 28, when the occupant grips on the gripping raising portion 47 with his or her fingers to cause the shutter 41 to slide forward to such an extent that the frontmost guide portions 48 on the shutter 41 ride over the engaging raising portions 96 on the box unit 70, the stopper portions 104 are brought into abutment with the engaging raising portions 96. That is, until the engaging raising portions 96 are respectively brought into engagement with the engaging recessed portions 105, the shutter 41 comes into abutment with the lid portion 79 in the closed state, as shown in FIG. 10. A state is thereby produced where the remaining portion of the opening 52 excluding the portion thereof which is covered by the box unit 70 is covered by the shutter 41. Even in this state where the shutter 41 is closed, the lid portion 70 of the box unit 70 can be opened and closed independently.

When the occupant grips on the gripping raising portion 47 with his or her fingers and causes the guide portions 48 to ride over the engaging raising portions 96 by sliding the shutter 41 from this state, an open area of the opening 52, which is being covered, increases according to a sliding amount of the shutter 41. For example, when the gripping raising portion 47 of the shutter 41 is withdrawn towards the shutter accommodating portion 40 to its maximum extent, the opening 52 is uncovered to its maximum extent. When the partition plate 55 is withdrawn towards the shutter accommodating portion 40 to its maximum extent so as to be located at the aforesaid rear end position, as shown in FIG. 6, the storage space S0 of the storage case 37 includes the opening 52, and is able to contain a relatively large article such as sunglasses, glasses, a remote controller of a car navigation system or the like. However, compared to the aforesaid case where the box unit 70 is not installed, the storage space S0 becomes narrower by such an extent that the box unit 70 is installed.

Figure 14:
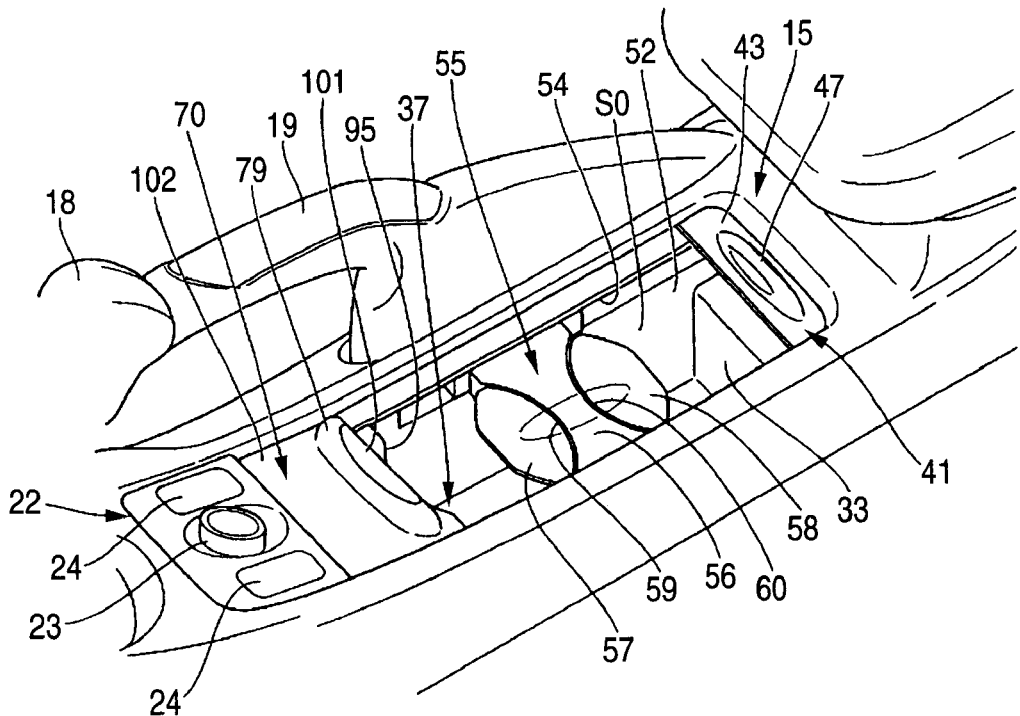
FIG. 14 is a perspective view showing the automotive storage apparatus according to the embodiment of the invention in which the box unit is installed, the shutter is fully opened and the partition plate is disposed at an intermediate stop position.
Figure 15:
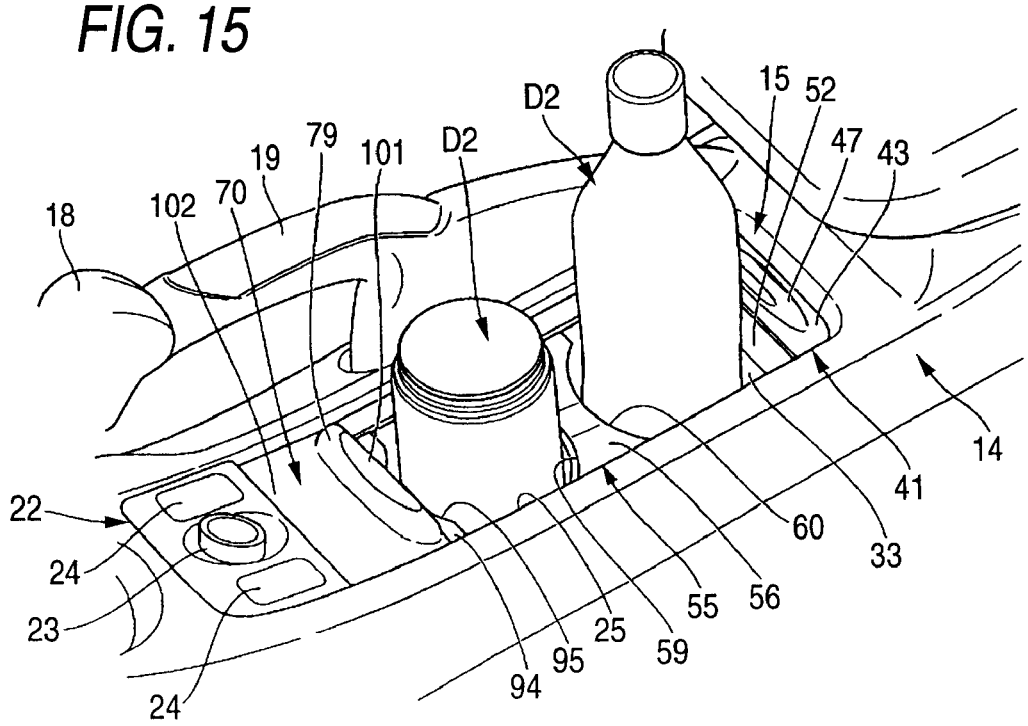
FIG. 15 is a perspective view showing a state in which the drink containers of the small size are inserted into the automotive storage apparatus shown in FIG. 14.

In addition, with the box unit 70 installed in the way described above and the opening 52 uncovered to its maximum extent, when the partition plate 55 is located at the intermediate stop position as shown in FIG. 14, the partition plate 55 is located at the position where the partition plate 55 divides the remaining portion of the opening 52 excluding the portion covered by the installed box unit 70 into two halves. As this occurs, as shown in FIG. 15, the drink containers D2 of the second size can be inserted into the storage apparatus main body 28 before and after the partition plate 55. Here, when the drink container D2 is inserted between the partition plate 55 and the box unit 70, the drink container D2 comes to be placed on the bottom plate portion 35 while causing the front flap 57 of the partition plate 55 to swing downward against the biasing force of the spring and allowing both side portions thereof to enter the front guide recessed portion 59 of the partition plate 55 and the guide recessed portion 95 of the protruding plate portion 94 of the box unit 70, respectively. As this occurs, the drink container D2 is held between the protruding plate portion 94 and the abutment plate portion 99 of the locking raising portion 97 on the box unit 70, which are shown in FIG. 7, and the flap 57 of the partition plate 55. Here, even if a drink container that is slightly smaller in size than the aforesaid one is inserted, the flap 57 is returned suitably due to the biasing force of the spring and presses the drink container against the box unit 70. The drink container is thereby held between the protruding plate portion 94 and the abutment plate portion 99 and the flap 57. In addition, when the drink container D2 of the second size is inserted between the partition plate 55 and the rear surface portion 33. The drink container D2 comes to be placed on the bottom plate portion 35 while causing the rear flap 58 of the partition plate 55 to swing downward against the biasing force of the spring and allowing the side portion thereof to enter the rear guide recessed portion 60 of the partition plate 55, and the drink container D2 so placed is then held between the rear surface portion 33 and the flap 58 by virtue of the biasing force of the spring. Also, in this case, even though the drink container which is slightly smaller in size than the aforesaid one is inserted, the flap 58 is returned due to the biasing force of the spring so as to press the drink container against the rear surface portion 33, whereby the drink container is held between the rear surface portion 33 and the flap 58. Note that even in such a state that the drink container D2 is placed in the way described above, the lid portion 79 of the box unit 70 can be opened and closed independently.

On the other hand, when attempting to remove the box unit 70 from the storage apparatus main body 28, the occupant hooks his or her finger or fingers on a lower side of the abutment plate portion 99 of the locking raising portion 97 of the box unit 70 via the storage space S0 in the storage apparatus main body 28 so as to pull up the box unit 70 in such a state that the shutter 41 is opened. Then, the box unit 70 rises while deforming the leaf spring 84 so as to be dislodged from the locking recessed portion 90, whereby the box unit 70 is eventually removed from the storage apparatus main body 28.

According to the automotive storage apparatus 15 of the embodiment that has been described heretofore, in such a state that the box unit 70 is not installed in the storage apparatus main body 28, the storage apparatus main body 28 can be used as the large storage space S0 as it is. When the box unit 70 is installed in the storage apparatus main body 28, the box unit 70 and the remaining portion of the storage apparatus main body 28 can be used as the separate independent storage spaces S0, S1. In this way, the storage space can be divided into the storage spaces S0, S1 or can be left undivided by installing or removing the box unit 70 as required so that various types of articles can be stored therein, and the convenience for use being thereby increased. Moreover, when the box unit 70 is not installed in the storage apparatus main body 28, the opening which opens upwards of the storage apparatus main body 28 can be covered by the shutter 41. When the box unit 70 is installed in the storage apparatus main body 28, the shutter 41 can be caused to slide to such an extent that the end portion thereof comes into abutment with the box unit 70, and the remaining portion of the opening 52 which is left uncovered after part of the opening 52 is covered by the box unit 70 can be covered. Consequently, whether or not the box unit 70 is installed in the storage apparatus main body 28, the opening 52 in the storage apparatus main body 28 can be covered by the shutter 41 properly. In addition, when the box unit 70 is installed in the storage apparatus main body 28, an article can be placed in or taken out of the box unit 70 without opening the shutter 41. Consequently, the convenience for use can be increased without sacrificing the functionality.

Furthermore, when the partition plate 55 is disposed at the intermediate stop position where the partition plate 55 divides equally the remaining portion of the opening 52 in the storage apparatus main body 28 excluding the portion of the opening 52 covered by the box unit 70 when the box unit 70 is installed in the storage apparatus main body 28, the storage space S0 resulting in the storage apparatus main body 28 can be divided equally. For example, the drink containers D2 which are relatively small and are of the same size can be held well on both the sides of the partition plate 55. In addition, with the partition plate 55 disposed at the position where the partition plate 55 divides equally the whole of the opening 52 in the storage apparatus main body 28 which results after the box unit 70 is removed, the storage space S0 resulting in the storage apparatus main body 28 with the box unit 70 removed can be divided equally. For example, the drink containers D1 which are relatively large and are of the same size can be held well on both the sides of the partition plate 55. In addition, since the partition plate 55 is provided below the shutter 41, once the shutter 41 is closed, the partition plate 55 can be covered by the shutter 41, thereby making it possible to obtain a good appearance.

In addition, in the event that the flaps 57, 58 of the partition plate 55 are caused to swing when storing the drink containers, a biasing force is applied to the drink containers from the flaps 57, 58, respectively. The drink containers are pressed against the opposite end sides of the storage apparatus main body 28 to the partition plate 55, respectively, so as to be held well. In addition, a plurality types of drink containers which are different in size can be dealt with by changing the swing angles of the flaps 57, 58. Consequently, each of the plurality of drink containers which are different in size can be held properly.

Additionally, since the shutter 41 is provided in such a manner as to be accommodated endwise at the one end edge side of the opening 52 in the storage apparatus main body 28, while the box unit 70 covers the other end edge side of the opening 52 in the storage apparatus main body 28 when installed in the storage apparatus main body 28, the whole of the remaining portion of the opening 52 in the storage apparatus main body 28 excluding the box unit 70 can be covered by the shutter 41, thereby making it possible to obtain a good appearance. Even when the box unit 70 is not installed, the whole of the opening 52 in the storage apparatus main body 28 can, of course, be covered by the shutter 41, thereby making it possible to obtain a good appearance.

Furthermore, since the box unit 70 has the protruding plate portion 94 which protrudes towards the one end edge side of the opening 52, that is, towards the shutter accommodating portion 40 when installed in the storage apparatus main body 28, the installation of the box unit 70 into the storage apparatus main body 28 in the reverse direction can be restricted, thereby making it possible to prevent the erroneous installation of the box unit 70. In addition, when the drink container D2 is stored in the storage space S0 in the storage apparatus main body 28, the drink container D2 can be held well by the guide recessed portion 95 of the protruding plate portion 94.

In addition, since the box unit 70 has below the protruding plate portion 94 the locking raising portion 97 which protrudes in the same direction as the direction in which the protruding plate portion 94 protrudes, the drink container D2, for example, can be held by both the upper protruding plate portion 94 and the lower locking raising portion 97, whereby the drink container D2 can be held better without being caused to fall down. In addition, when attempting to remove the box unit 70, the finger or fingers are allowed to be easily hooked on the locking raising portion 97, so as to facilitate the removal of the box unit 70.

Furthermore, since the engaging raising portions 96 provided on the protruding plate portion 94 of the box unit 70 are brought into engagement with the engaging recessed portions 105 at the end portion of the shutter 41 when the shutter 41 is closed, the closed state of the shutter 41 can be maintained well.

In addition, since the shutter 41 and the box unit 70 become flush with each other at the main upper surfaces 102, 103 thereof when the shutter 41 and the box unit 70 are in abutment with each other, the storage apparatus is allowed to obtain a better appearance.

Note that while in the embodiment that has been described heretofore, the automotive storage apparatus 15 is described as being provided on the center console 14, the automotive storage apparatus 15 of the invention can, of course, be provided in any other positions, if within the passenger compartment of the vehicle.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others killed in the art to understand the invention for various embodiments and with the various modifications as are suited to the particular use contemplated. It is intended that the scope of the invention be defined by the following claims and their equivalents.

What is claimed is:

1. An automotive storage apparatus comprising:
a storage apparatus main body having an opening that opens upwards;
a detachable box unit selectively installed in the storage apparatus main body that covers part of the opening of the storage apparatus main body when the box unit is installed in the storage apparatus main body; and
a lid unit that is adapted to abut the box unit at an end portion thereof when the box unit is installed in the storage apparatus main body and is adapted to extend completely over the opening when the box unit is removed from the main body opening,
wherein the lid unit slides to cover and uncover the opening of the storage apparatus main body.

2. The automotive storage apparatus as set forth in claim 1, wherein the lid unit and a main upper surface of the detachable box unit are flush with each other when the lid unit abuts the detachable box unit.

3. The automotive storage apparatus as set forth in claim 1, further comprising a partition member provided on the storage apparatus main body that slides below the lid unit.

4. The automotive storage apparatus as set forth in claim 3, the partition member comprising a swinging flap that is biased in a sliding direction of the partition member.

5. The automotive storage apparatus as set forth in claim 3, wherein the partition member equally divides the remaining part of the opening that is left uncovered when the detachable box unit is installed.

6. The automotive storage apparatus as set forth in claim 3, wherein the partition member equally divides the entirety of the opening that is left uncovered when the detachable box unit is removed.

7. The automotive storage apparatus as set forth in claim 3, wherein the partition member comprises a swinging flap which is swingably attached to the partition member and is biased so as to be parallel with the lid unit.

8. The automotive storage apparatus as set forth in claim 1, wherein the lid unit is retractable towards an edge side of one end of the opening, and the detachable box unit covers an edge side of another end of the opening when installed in the storage apparatus main body.

9. The automotive storage apparatus as set forth in claim 8, the detachable box unit further comprising a protruding portion that protrudes towards the edge side of the one end of the opening when the detachable box unit is installed in the storage apparatus main body.

10. The automotive storage apparatus as set forth in claim 9, the detachable box unit further comprising a raising portion provided below the protruding portion, wherein the raising portion protrudes towards the edge side of the one end of the opening.

11. The automotive storage apparatus as set forth in claim 9, the protruding portion further comprising an engagement portion that engages with the end portion of the lid unit.

12. The automotive storage apparatus as set forth in claim 1, wherein the detachable box unit has a box opening that opens upwards and a box lid which selectively covers and uncovers the box opening, wherein the box lid can selectively cover and uncover the box opening independent of whether the opening of the storage apparatus is covered or uncovered by the lid unit.

13. The automotive storage apparatus as set forth in claim 12, wherein the lid unit and a main upper surface of the box lid of the detachable box unit are flush with each other when the lid unit abuts the detachable box unit.

14. The automotive storage apparatus as set forth in claim 12, further comprising a partition member provided on the storage apparatus main body that slides below the lid unit.

15. The automotive storage apparatus as set forth in claim 14, wherein the partition member comprises a swinging flap that is biased in a sliding direction of the partition member.

16. The automotive storage apparatus as set forth in claim 14, wherein the partition member equally divides the remaining part of the opening that is left uncovered when the detachable box unit is installed.

17. The automotive storage apparatus as set forth in claim 14, wherein the partition member equally divides the entirety of the opening that is left uncovered when the detachable box unit is removed.

18. The automotive storage apparatus as set forth in claim 14, wherein the partition member comprises a swinging flap which is swingably attached to the partition member and is biased so as to be parallel with the lid unit.

* * * * *